United States Patent
Tidwell

[11] 3,922,013
[45] Nov. 25, 1975

[54] WAVE MOTOR

[76] Inventor: Hubert Tidwell, Box 57, Wellington, Utah 84542

[22] Filed: Mar. 4, 1974

[21] Appl. No.: 447,879

[52] U.S. Cl. .............................................. 290/53
[51] Int. Cl.² ....................................... F03B 13/12
[58] Field of Search ................. 290/42, 43, 53, 54

[56] References Cited
UNITED STATES PATENTS
| | | | |
|---|---|---|---|
| 867,459 | 10/1901 | Willard | 290/43 X |
| 2,179,537 | 11/1939 | Zoppa | 290/42 |

Primary Examiner—Robert K. Schaefer
Assistant Examiner—W. E. Duncanson, Jr.
Attorney, Agent, or Firm—B. P. Fishburne, Jr.

[57] ABSTRACT

A main buoyant platform can rise and fall with the tide and is guided by an anchored vertical post. The entire mechanism which is motivated by the waves is mounted on the main platform so as to be safe from destruction by storms. The main platform can be elevated to a safe position above the water in stormy conditions, or the main platform and the apparatus thereon could be submerged to a safe position through a suitable ballasting arrangement. The wave motor mechanism proper embodies float weight units which are guided. They are elevated by flotation on contact with waves and then are released at the top of their travel so that they may fall by gravity. The energy of the falling float weights is utilized through a cable, clutch and drive shaft system to produce usable power.

7 Claims, 5 Drawing Figures

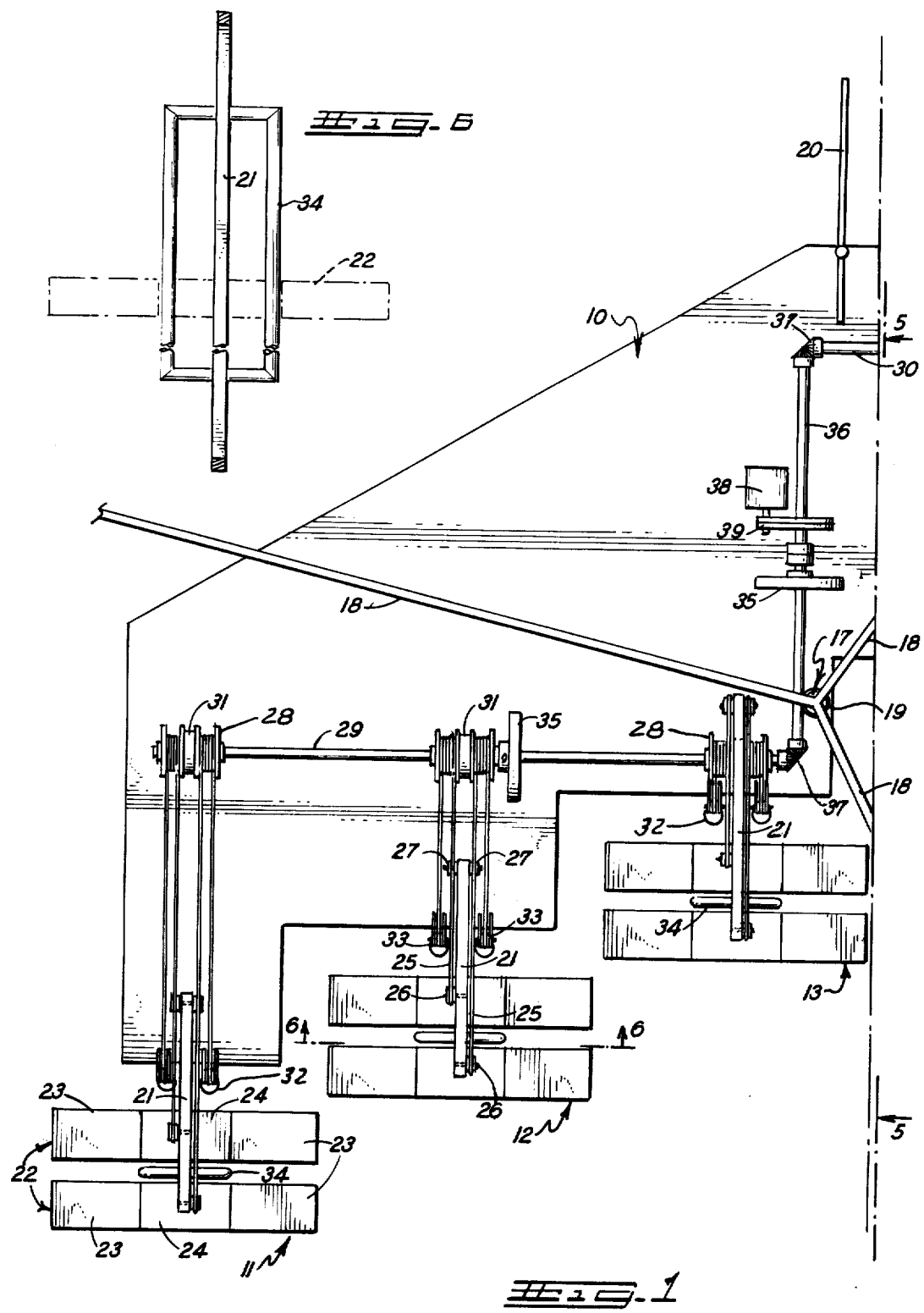

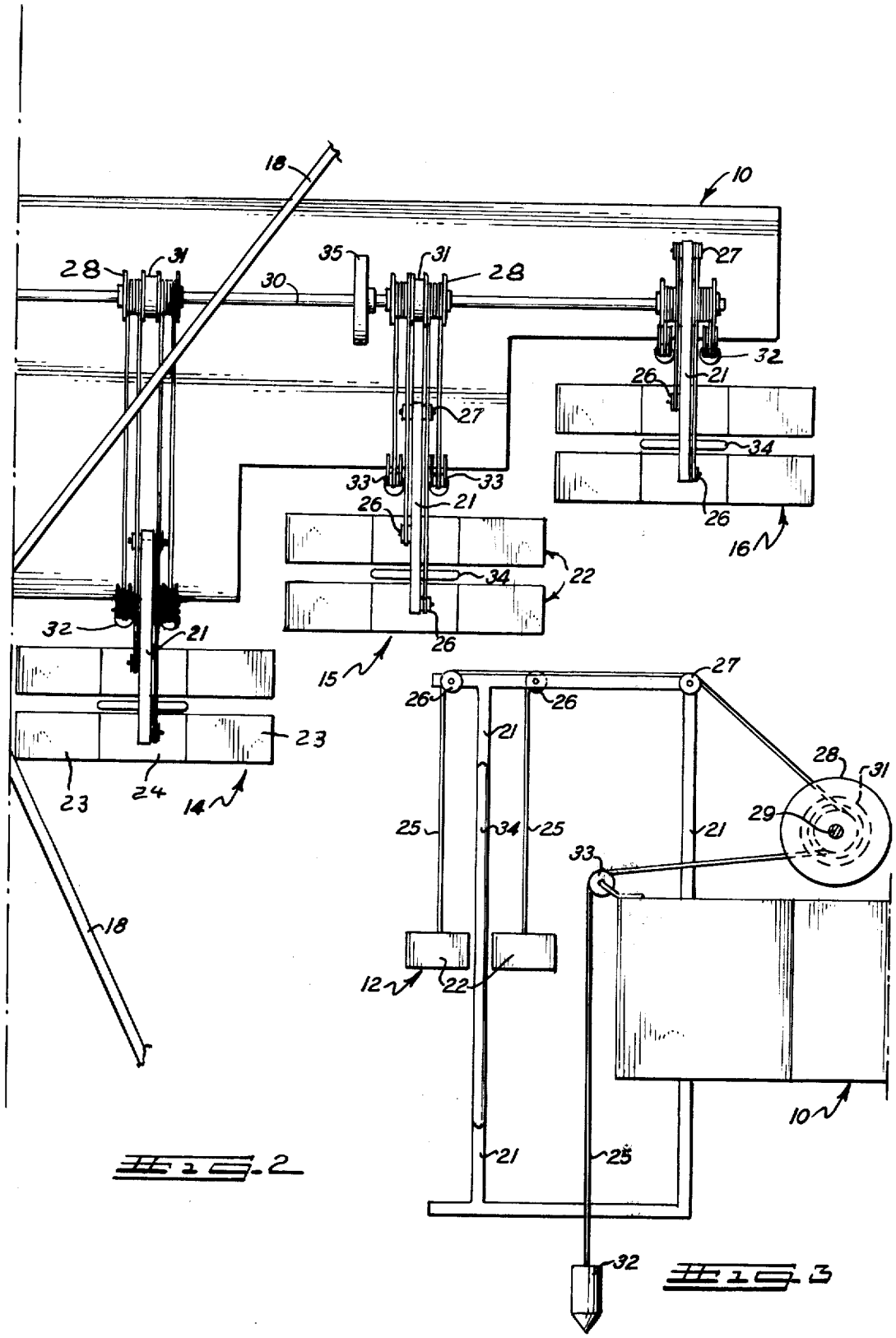

3,922,013

WAVE MOTOR

BACKGROUND OF THE INVENTION

Wave and tide motors have been proposed in the patented prior art in a variety of forms for many years. While many of the proposals unquestionably have merit from the standpoint of their ability to convert wave energy into useful power, nevertheless these wave motors have not proven practical up to the present time. The main reason for their impracticality is twofold. First, to produce an apparatus of sufficient size to meet practical energy needs requires a major investment of money, and secondly, the tendency for the apparatus to be damaged or destroyed by storms has created a reluctance by investors to build wave motors and the like except on a limited experimental basis.

With the above factors in mind, the present invention has for its objective to provide a truly practical wave motor which not only has a more reliable mode of operation than the prior art but also possesses the ability to withstand the forces of nature including severe storms and heavy tides. More particularly, as a major feature of the invention, a mechanism has been devices whereby the energy of the waves is utilized to elevate weights or masses on a guidance means or support provided on the main buoyant platform. At the tops of their movements under influence of waves, the guided masses are released and are allowed to fall under the influence of gravity, and in so doing, a power generating system is energized and useful power is harnessed. This is counter to the customary procedure in the prior art where the elevation of floats responsive to wave action is directly utilized to operate power generating mechanisms. While this would seem to be the proper avenue to follow in terms of directness, it is believed that this has resulted in the formation of structures which are too frail to withstand the conditions encountered in the surf and winds. The float structures of the prior art tend to be light and buoyant, presumably to deliver the maximum wave energy directly to a particular generating mechanism, and this is thought to be the fallacy in much of the unsuccessful prior art.

In contrast to this, the present invention utilizes as its basic energy converting element a float weight unit or assembly which is sufficiently buoyant to be elevated by flotation and impact responsive to wave action, but is also sufficiently massive to be stable during its vertical movement both upwardly and downwardly in relation to a guidance system. During the upward movement of the float weight assemblies, wave energy is not directly converted into mechanical or electrical energy, and a system of clutches or other escapement means allows this to occur. However, when a given wave has passed beyond the mechanism, the elevated float weitht assembly is allowed to fall by gravity and in so doing is again guided and stabilized so as to avoid wild gyrations which could adversely effect the operation or damage the structure. During the descent of the float weight assemblies, the inertial energy thereof is transmitted by one-way active clutches or the like and an associated mechanical system to a means, such as a generator, for producing useful power.

Not only is the above-described system more smooth, reliable and efficient than known prior art systems, but it is much more practical in terms of ruggedness and durability, enabling it to stand up under the elements, and this is mainly due to the utilization of the massive float weight assemblies in contrast to lightweight unrestrained floats. Coupled with the fact that the entire platform and mechanism may be elevated or submerged to safe positions in heavy weather, it is believed that the apparatus is entirely practical, both in terms of operation and economics. It is also characterized by relative simplicity of construction in comparison to much of the patented prior art.

Other features and advantages of the invention will become apparent during the course of the following detailed description.

BRIEF DESCRIPTION OF DRAWING FIGURES

FIGS. 1 and 2 togethr constitute a plan view of a wave motor apparatus embodying the invention.

FIG. 3 is a side elevation of one wave motor mechanism with associated guidance and support means.

FIG. 6 is a fratmentary vertical section taken on line 6—6 of FIG. 1.

DETAILED DESCRIPTION

Figures 4, 5:
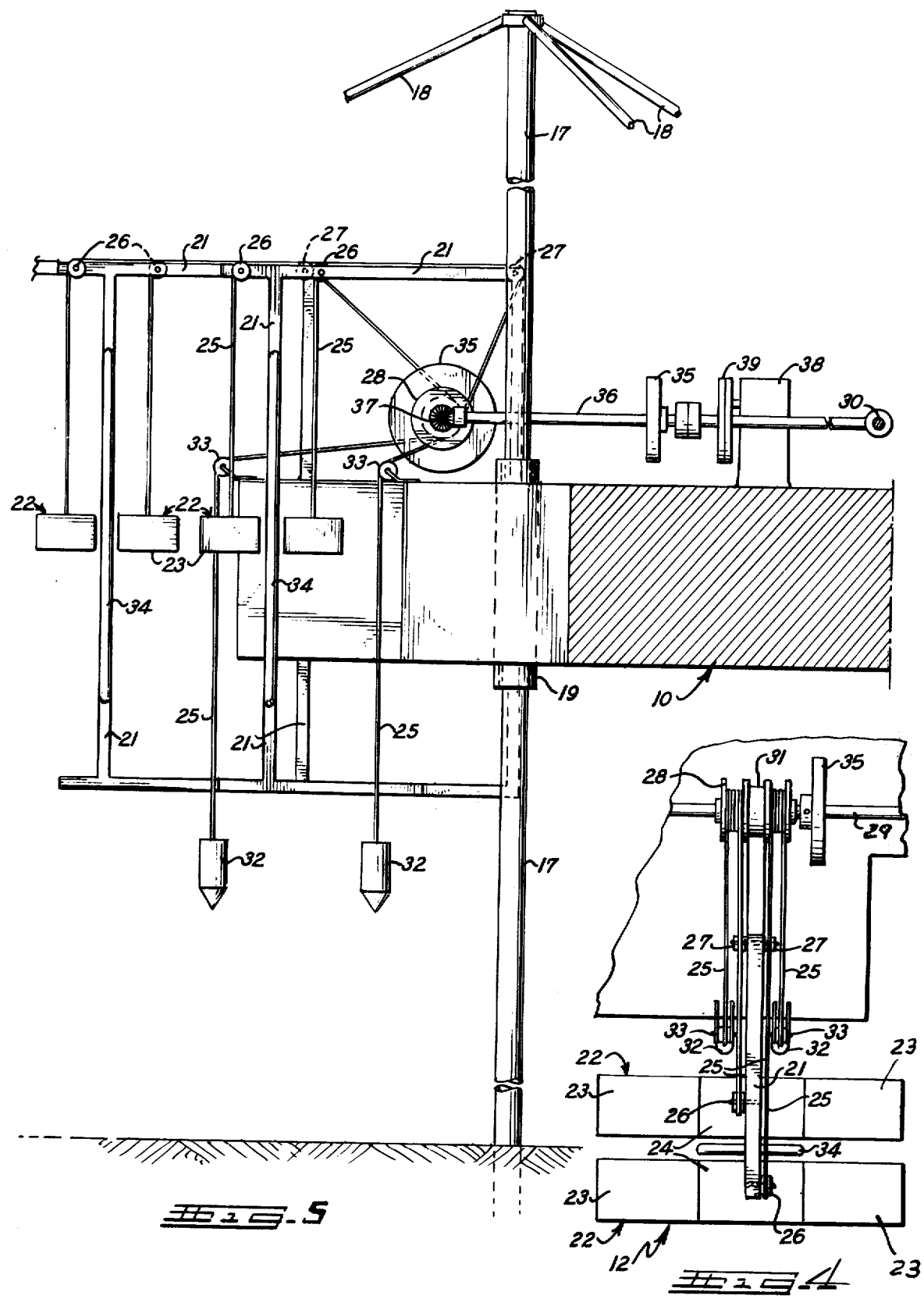
FIG. 4 is a plan view of the mechanism shown in FIG. 3.
FIG. 5 is a cross section taken substantially on line 5—5 of FIG. 1.

Referring to the drawings in detail, the numeral 10 designates a main buoyant platform or body portion upon which is mounted all of the apparatus constituting the invention. While the platform 10 is a float, it is contemplated for providing in the platform water ballast compartments, not shown, which could be flooded to allow submerging the entire apparatus for safekeeping in extremely rough weather. The shape of the platform 10 as viewed in FIGS. 1 and 2 is of no particular significance except that it is made in a stepped formation, as shown, to accomodate the required number of wave energy converting units designated by the numerals 11, 12, 13, 14, 15 and 16. The invention is not limited to the precise arrangement or number of energy converting units shown in the drawings, and the application discloses only one possible embodiment of the invention in this respect.

In order that the platform 10 may rise and fall with the tides in a controlled manner, a vertical post 17 is securely anchored to the bottom and extends well above the surface of the water and is stabilized by the required number of guy cables 18. The platform 10 carries a generally central guide sleeve 19 which telescopes over the post 17 and is guided thereby as the platform changes vertical positions with the incoming and outgoing tides. Hoisting means, not shown, may be provided to elevate the entire apparatus including the main platform 10 to a safe position above the water surface to safeguard the apparatus in storms.

Means in the form of a rudder-like vane 20 is provided on the side of the platform 10 facing the shore for the purpose of aligning the several wave energy converting units 11 through 16 in the face of waves rolling toward the shore. The offshore wind influences the direction of the waves, and the rudder or vane 20 will respond to the direction of the wind to keep the units 11 through 16 facing squarely into the waves.

Each wave energy converting unit 11 through 16 comprises a generally rectangular vertical frame 21 of rigid construction and anchored securely to the main platform 10 so as to be rigid therewith. The units 11 through 16 and their frames 21 are arranged in stepped or staggered relation across the platform 10, FIGS. 1 and 2, with each successive unit arranged slightly nearer the shore. This arrangement allows the apparatus to derive the greatest energy possible from each wave as the latter rolls toward the shore and the energy from that wave converted by each unit 11 through 16 is delivered to the transmission mechanism, yet to be described, in sequence rather than simultaneously, thus lengthening the energy cycle of each wave.

Associated with each vertical frame 21 of each energy conversion unit is a pair of independently operable float weight assemblies 22, each composed of a pair of end flotation bodies 23 and a center integral weight portion 24 formed of concrete or other massive substance. The elements 23 and 24 are joined together to form a single rigid body which has sufficient buoyancy to be elevated by passing waves and sufficient mass to utilize gravity efficiently during downward movement to convert wave energy into useful power in a delayed action mode rather than directly during the rising of the assemblies 22. The two assemblies 22 of each energy conversion unit 11 through 16 are independently movable vertically but are capable of moving in unison in a particular situation governed by the waves, their size, frequency and amplitude.

Each float weight assembly 22 is suspended on the frame 21 by a cable 25, and each cable 25 is trained over a separate guide pulley 26 on the top of frame 21. From these pulleys, the cables 25 extend horizontally to additional guide pulley means 27 on each frame 21 and are then directed downwardly and coiled about a divided winding spool 28 mounted on a line shaft 29 supported in suitable bearings, not shown, on the float 10. The line shaft 29 as shown in FIG. 1 extends adjacent to three of the units 11, 12 and 13 and is perpendicular to their frames 21. A second parallel and offset line shaft 30 similarly mounted in bearings on the platform 10 extends adjacent to the remaining units 14, 15 and 16.

Each cable winding spool 28 is coupled with one of the line shafts 29 or 30 by a built-in one-way active and one-way free wheeling clutch device 31 of a conventional type. Such devices are well known in the art and need not be described in detail herein for a proper understanding of the invention. Suffice it to say that during upward movement of the float weight assemblies 22, the associated clutch 31 free wheels and therefore no rotation is transmitted to the line shafts 29 and 30. This is during the time that the wave is actually elevating the float weight unit 22. When the wave has moved beyond the particular unit and the water level adjacent thereto has suddenly dropped, gravity will act on the elevated assembly 22 and the same is allowed to fall, and during this descent, the associated clutch 31 is active and thus transmits rotation from the falling float weight assembly to the associated shaft 29 or 30. Therefore, the invention embodies a delayed action response or conversion of wave energy to useful work by means of the rising and falling of the several float weight assemblies 22, in conjunction with their associated clutches 31 and cable mechanisms.

Each unit 11 through 16 additionally embodies on the end of each suspension cable 25 remote from the assemblies 22 a freely suspended weight 32 of sufficient size to maintain the particular cable properly tensioned and free of slack. Each cable 25 has several turns wrapped about its winding spool 28 and then beyond this spool each cable 25 is equipped with the slack eliminating weigt 32 and is suitably guided as at 33 by a pulley or the like on the platform 10 so that the weight 32 may extend well into the water below the platform. The weights 32 are small in comparison to the weight of each assembly 22 and therefore have no appreciable effect on the assemblies 22 in counterbalancing sense. The guidance pulleys 33 may be eliminated, in which case vertical clearance openings for the cable and weights 32 may be formed through the platform 10 close to and below the line shafts 29 and 30.

A means is provided on each vetical frame 21 to guide the assemblies 22 independently during their vertical movement and to restrain them from shifting or swinging in one direction. Such means comprises vertical rectangular sub-frames or loops 34, FIG. 6 welded or otherwise rigidly secured to each frame 21 and extending in a plane at right angles thereto. The vertical subframes 34 which are thus rigid with the main frames 21 are disposed between the pairs of float weights 22, as clearly shown in the drawings, and when the assemblies 22 tend to move toward the plane of sub-frames 34, they will contact the same and have their movement arrested. By this means, the companion assemblies 22 are prevented from colliding and are also prevented from turning or twisting on the axes of their suspension cables 25 and are maintained generally in parallelism and properly spaced. The assemblies 22 need not be restrained from movement endwise but only in the direction of movement of the waves which strike them so as to prevent what might be otherwis wild swinging of the pendulum-like masses.

It may be mentioned here that during actual operation in an offshore location of the apparatus, the assemblies 22 will normally be partly submerged or fully submerged depending upon tide conditions, and this submergence furthe stabilizes the operation of the assemblies and dampens their movement, in contrast to the condition which could prevail if these masses were suspended in the air.

The operation of the power transmission apparatus is further dampened and rendered smooth by the provision of flywheels 35 on the two line shafts 30 and on the interconnecting right angular transmission shaft 36 operatively connected with the shafts 29 and 30 by bevel gears 37 or the like. Adjacent to the transmission shaft 36 and fixed to the platform 10 is an electrical generator 38 or the like coupled to the shaft 36 by suitable gearing 39. By this means, the energy of each wave, large or small, rolling toward the shore is first converted into lifting movement of each assembly 22, followed by gravity-influenced falling of the assembly after the wave has passed. This falling movement of each assembly 22 is transmitted through the cable system of each unit 11 through 16 and the associated one-way active clutch 31 to the line shaft 29 or 30 as unidirectional rotation. This unidirectional rotation of the line shafts is transmitted to the generator 38 through the interconnecting transmission shaft 36. Consequently, each wave energy conversion unit 11 through 16 in turn is acted upon by each wave to produce some rotation of the shafts 29 and 30 and collectively the several units of the apparatus will effectively drive the generator continuously as long as waves of some appreciable size are rolling in.

In a practical installation of the invention along an ocean shoreline, sufficient to generate usable power, a number of the total apparatus assemblies consisting of platform 10 and the several units 11 through 16 thereon would be installed offshore. These units would be in end-to-end relationship following the shoreline, and sufficiently close to allow workers to step from one platform 10 to the next or to utilize a short gangplank, if need be.

It will be appreciated that the only force necessary to drive the described wave motor is the force of the waves acting on the weight float assemblies 22. Given this force which is always available in nature plus the force of gravity, the mechanism operates automatically and continuously to generate power. The simplified and sturdy construction renders maintenance costs minimal and the apparatus should require only occasional attendance and inspection.

It is to be understood that the form of the invention herewith shown and described is to be taken as a preferred example of the same, and that various changes in the shape, size and arrangement or parts may be resorted to, without departing from the spirit of the invention or scope of the subjoined claims.

I claim:

1. A wave motor comprising an offshore support, multiple wave energy conversion units on the support, each conversion unit embodying at least one float-weight assembly adapted to be suspended in the surf, suspension and guidance means for said float-weight assembly of each conversion unit on the support enabling each float-weight assembly to be elevated by waves and to descend under the influence of gravity in a constrained path after the passage of each wave, and power transmission means on said support common to the wave energy conversion units and including one-way active and one-way free wheeling transmission elements one for each said conversion unit, whereby the float-weight assembly of each unit is first elevated by each wave and then released for falling gravity and such falling motion is transmitted through said one-way active transmission elements into useful work energy, and said multiple wave energy conversion units arranged in laterally spaced and stepped relation on said support, whereby progressing laterally each unit is arranged successively closer to the shore in relation to oncoming waves, whereby the wave energy of each wave may be utilized by the wave motor over an extended time interval.

2. A wave motor as defined by claim 1, and said suspension and guidance means comprising an upright frame attached to said support and extending above and below the support and including a vertical guide component arranged in close relation to one side of said float weight assembly and preventing rotation of the latter on the axis of its suspension cable or swinging movement of the float weight assembly in one direction.

3. A wave motor comprising an offshore support, multiple wave energy conversion units on the support, each conversion unit embodying at least one float-weight assembly adapted to be suspended in the surf, suspension and guidance means for said float-weight assembly of each conversion unit on the support enabling each float-weight assembly to be elevated by waves and to descend under the influence of gravity in a constrained path after the passage of each wave, and power transmission means on said support common to the wave energy conversion units and including one-way active and one-way free wheeling transmission elements one for each said conversion unit, whereby the float-weight assembly of each unit is first elevated by each wave and then released for falling by gravity and such falling motion is transmitted through said one-way active transmission elements into useful work energy, and each conversion unit comprising an upright frame secured to said offshore support, a pair of independently operable float-weight assemblies having guided engagement with a vertical portion of said frame, suspension cable means for each float-weight assembly having guided engagement with said frame, a rotary transmission shaft extending adjacent said conversion units and carrying spools for engagement with said suspension cable means, and one-way active clutch devices serving to interconnect said spools with said transmission shaft whereby descending movement of said float-weight assemblies will produce incremental rotation of said shaft in one direction.

4. A wave motor as defined in claim 3, and slack-inhibiting weights freely suspended on the ends of said cable means of each conversion unit.

5. A wave motor as defined in claim 3, and a wind rudder on said platform for keeping said conversion units headed directly into the paths of waves rolling toward the shore.

6. A wave motor as defined by claim 3, and a guidance sub-frame attached to each upright frame in right angular relationship thereto and disposed between said pair of float weight assemblies to restrain and guide the movements thereof and to prevent colliding of said assemblies in their independent vertical movements.

7. A wave motor as defined by claim 3, and said multiple conversion units arranged in staggered relation on said support, said support comprising a platform float, a pair of spaced parallel line shafts journaled on said platform float and each being common to a group of said conversion units, said spools and one-way active clutch devices being on said spaced parallel line shafts, a transmission shaft operatively interconnecting said line shafts and driven thereby in one direction, and a power generator coupled with said transmission shaft.

* * * * *